United States Patent [19]

Svensson et al.

[11] 4,245,254
[45] Jan. 13, 1981

[54] IMAGE MOTION COMPENSATOR

[75] Inventors: Emil L. Svensson, Ellicott City; Craig D. Walrath, Baltimore, both of Md.

[73] Assignee: Westinghouse Electric Corp., Pittsburgh, Pa.

[21] Appl. No.: 938,164

[22] Filed: Aug. 30, 1978

[51] Int. Cl.³ .............................................. H04N 5/00
[52] U.S. Cl. ..................................... 358/222; 358/109
[58] Field of Search ................................ 358/109, 222

[56] References Cited

U.S. PATENT DOCUMENTS

| 2,869,803 | 1/1959 | McGee | 358/222 |
|---|---|---|---|
| 3,293,360 | 12/1966 | Smith | 358/222 |
| 3,371,161 | 2/1968 | Crovella | 358/222 |
| 3,393,320 | 7/1968 | Arazi | 358/109 |
| 3,515,881 | 6/1970 | Philbrick et al. | 358/222 |
| 3,518,372 | 6/1970 | Johns | 358/222 |
| 3,577,205 | 5/1971 | Hobrough | 358/222 |
| 3,619,500 | 11/1971 | Bouley | 358/222 |
| 3,641,261 | 2/1972 | Chaplin et al. | 358/222 |
| 3,858,002 | 12/1974 | Baillet et al. | 358/222 |
| 3,944,729 | 3/1976 | Tsovbanos | 358/109 |
| 4,040,087 | 8/1977 | Hall | 358/222 |

OTHER PUBLICATIONS

Terman—Electronic and Radio Engineering—McGraw Hill Book Co.—published 1955, pp. 241–243.
Teuling—Electronic Image Motion Compensation in a Portable Television Camera—Eindhoven Univ. of Tech.—1970—pp. 1–23.

Primary Examiner—Richard Murray
Assistant Examiner—Joseph A. Orsino, Jr.
Attorney, Agent, or Firm—W. E. Zitelli

[57] ABSTRACT

An image motion compensator which electronically compensates for image distortion in an electro-optical system is disclosed. The electro-optical system comprises a TV camera having an image intensifier portion which includes a plurality of deflection coils disposed therein for deflecting the electron image of the TV camera as a function of the current passing therethrough; and at least one optical element for guiding the line-of-sight of the TV camera to project predetermined target images on the receiving area thereof. More specifically, accelerometers are used to sense movement of a predetermined optical element of the electro-optical system. An electronic processing unit separates from the accelerometer measurements substantially that movement of the predetermined optical element which may be causing distortion to the projected target images and governs the current passing through the plurality of deflection coils based on the separated undesirable movement measurement to electronically compensate for this image distortion in the TV camera. In addition, the image motion compensator further alters the deflection coil current as a function of variations in the high-voltage potential which is applied across the image intensifier portion of the TV camera.

8 Claims, 3 Drawing Figures

IMAGE MOTION COMPENSATOR

BACKGROUND OF THE INVENTION

The present invention relates broadly to the general field of electro-optical equipment and more particularly, to a highly responsive electronic image motion compensation system which is capable of electronically compensating for unwanted vibrations of the optical equipment over a wide frequency range to improve the quality of resolution of the target images projected on the receiving area of a TV camera included as part of the electro-optical equipment.

It is widely known that electro-optical equipment is being used to view objects as part of surveillance and guidance assist mechanisms for both stationary and mobile devices, such as aircraft, missiles, robots and the like. Electro-optical equipment used for these purposes generally comprise a conventional TV camera including an image intensifier portion; and a number of optical elements for optically guiding the line-of-sight of the TV camera to a predetermined target object, thereby projecting the target images(s) on the picture receiving area of the TV camera. In some electro-optical systems, a scan of the viewing field of the TV camera is accomplished with the implementation of at least one movable image reflector optical element, such as a mirror or prism, for example, which optically directs the line-of-sight path of the TV camera. Movable reflectors of this type are generally pivoted in one or more axes under the control of a gimballed mechanism as shown simply in FIG. 1.

Unwanted angular rotational movements of the reflector are normally caused by resonating vibrations and disturbances generated primarily from a stable body supporting structure. Unwanted movement of the reflector about the axis which is normal to both the incident and reflected line-of-sight paths (see FIG. 1) is the more difficult to mechanically stabilize mainly because unwanted reflector motions can exist in that axis while no corresponding motion occurs of the stable body, the body whose position is controlled by conventional stabilization systems. This phenomenon occurs when the structural members supporting the stable body and reflector experience angular perturbations not experienced by the TV camera system (see FIG. 1). These mechanically uncompensated vibrating angular rotations of the reflector optical element, result, in most cases, in blurred and fuzzy images at the receiving area of the TV camera. To overcome this mechanical stabilization problem, attempts have been made to compensate for this unwanted angular motion electronically, instead of mechanically, to prevent loss of resolution of the TV images within the TV camera resulting therefrom.

Electronic image motion compensation systems similar to the one disclosed in U.S. Pat. No. 3,641,261 entitled "Night Vision Systems", issued Feb. 8, 1972 to R. W. Chaplin et al. may be used for these purposes and may be comprised of a gyro mechanism disposed at a movable reflector to measure unwanted angular deflection of the reflector optical element and to generate signals representative thereof; and a plurality of electron beam deflection coils, which are positioned at the image intensifier portion of a conventional TV camera system, for canceling out the vibrating disturbances influencing the projected image within the TV camera intensifier as governed by the measurement signals of the gyro mechanisms.

One disadvantageous feature of this type of image motion compensator is that the gyro mechanisms used for measuring unwanted vibrating movement of the reflector element are somewhat limited in their measurement frequency bandwidth. Even the more precision and costly gyro mechanisms have only an effective bandwidth of 100 to 200 Hz while the less costly gyros may be limited to a bandwidth of merely 50 Hz or less. Since it is known that these optical reflector-type elements may incur, at times, vibrating disturbances in the frequency ranges above 200 Hz due to resonances developed in the structural support elements, for example, it appears that the electronic motion compensators of the type described supra may be inadequate, in all cases, to compensate for vibratory disturbances, especially those above 200 Hz. Therefore, one may still expect a loss of resolution in the TV picture manifested as blurred and fuzzy images which are passed uncompensated to the TV camera system as a result of the undetected higher frequency disturbances of the reflector element. Furthermore, these resulting blurred and fuzzy TV images on a per-frame basis may hamper any correlation operations, such as normally used in guidance assist type systems, for example, which require sharp, crisp and highly resolvable images. For this reason, it is felt that an improvement in the resolution quality of the image rendered by the electro-optical systems is of considerable importance to maintain the integrity of the highly sophisticated, automatic guidance and control systems normally connected therewith.

In some airborne applications of these electro-optical guidance assist mechanisms, packaging density of the equipment is constantly being reviewed for improvement. For example, in the aforementioned image motion compensation system, it has been noted that the gyro mechanisms used for measuring unwanted disturbances of the movable optical elements generally have approximate cylindrical packaging dimensions of one inch (2.54 cm) in diameter and two inches (5.00 cm) in length and usually weigh between 4 and 5 ounces (109 to 136 grams). It is felt by some that the functional purpose for which these gyros are used does not warrant such volume and weight especially in airborne applications and that in these cases, it would be desirable to facilitate the same function with a reduction in packaging density.

In view of the above, it is evident that known electronic image motion compensation systems could be improved to measure vibrating disturbances of the reflector optical element over a wider frequency range thus enhancing the capability of compensating for these vibrating disturbances to effectively increase the quality of resolution of the TV images. In addition, any size, weight and cost improvements of the image motion compensation systems will further increase their commercial attractiveness, especially their utilization in airborne guidance assist type systems.

SUMMARY OF THE INVENTION

In accordance with the present invention, an electronic image motion compensator is included in an electro-optical system which further includes a TV camera having an image intensifier portion and a plurality of deflection coils disposed therein for deflecting the electron images of the TV camera as a function of the current passing therethrough; and at least one optical element for guiding the line-of-sight path of the TV camera to project predetermined target images on the receiving area of the TV camera. The at least one optical element of the electro-optical system may incur, at times, both desirable and undesirable movements with respect to the TV camera, the undesirable movement of which being that which may cause distortion of the projected target images. More specifically, the electronic image compensator comprises at least two accelerometers which are disposed at a predetermined optical element in the electro-optical system for generating signals representative of the movement of the predetermined optical element; a first means for substantially separating from the accelerometer signals a first signal representative of the undesirable movement of the predetermined optical element; a second means for converting the separated first signal into a second signal which is representative of the distortion to the predetermined target images; and a third means for supplying current to the plurality of deflection coils as a function of the second signal to electronically compensate for the distortion of the projected target images in the TV camera. In addition, the image motion compensator further includes a fourth means which alters the current supplied to the deflection coils in accordance with a function of the high voltage potential which is applied across the image intensifier section of the TV camera.

DESCRIPTION OF PREFERRED EMBODIMENT

Figure 1:
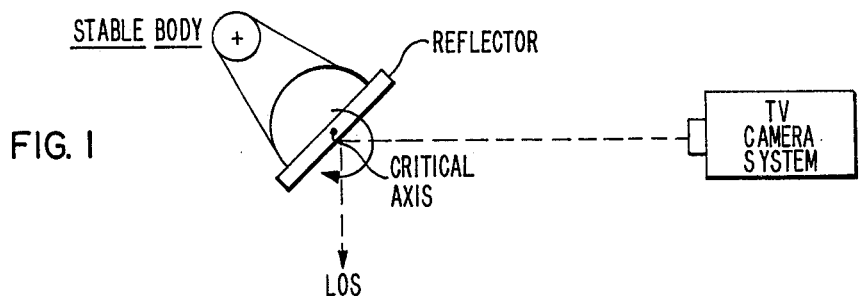
FIG. 1 is a simplified sketch illustrating the principles of operation of a type of electro-optical system.
Figure 2:
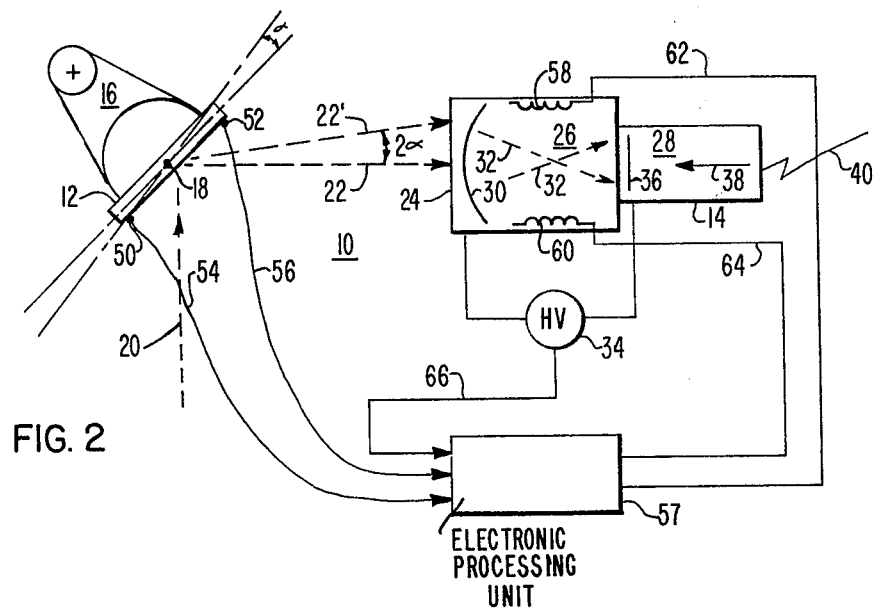
FIG. 2 is a more detailed sketch of the electro-optical system of FIG. 1 which includes an electronic image motion compensator embodiment suitable for describing the broad principles of the present invention.

Referring to FIG. 2, a typical electro-optical system 10 especially for use as a guidance assist mechanism in a device such as an aircraft or missile, for example, normally includes a plurality of optical elements and may include at least one movable image reflector optical element 12 for scanning the field of view with the line-of-sight of a conventional TV camera 14. A mirror is used as the reflective element 12 for the purposes of describing the preferred embodiment, but it is understood that a prism or other image reflector element may also be used to perform the same function without deviating from the principles of the invention. In general, a typical gimballed mechanism 16 is used to pivot the mirror reflector 12 about at least one axis 18 which is normal to both the incident image rays from a predetermined target shown simply by dotted line 20 and the reflected image rays also shown simply by dotted line 22. The reflected image rays 22 are projected onto the picture receiving area 24 of the TV camera 14. The gimballed mechanism 16 may employ a 2:1 mechanical coupling mechanism as is well known to those skilled in the pertinent art. This 2:1 coupling mechanism allows the mirror 12 to be rotated about the axis 18 over only ½ of the scan angle of the line-of-sight of the TV camera 14. In one simple form, the TV camera 14 may include an image intensifier portion 26 and an electron gun portion 28. The image intensifier section 26 further includes a photocathode 30 which conventionally converts the light image denoted by 22 to an electron image 32 which is accelerated by a high potential in the approximate range of 2–10 KV and focused on an integrating and electron multiplying target 36. The high voltage potential is supplied by a conventional voltage source 34. In the electron gun portion 28 of the TV camera 14, the electron image of the target 36 may be "read out" in a well-known manner by means of an electron gun shown simply at 38 and transmitted preferably to a guidance assist mechanism (not shown) over signal line 40.

In a typical operation, the reflector element 12 is controlled by the gimballed system 16 about the at least one axis 18 to guide the image light rays 20 from a predetermined target over the reflected path 22 to the picture receiving area 24 of the TV camera 14. The light image 22 is converted to an intensified electron image 32 and projected onto the target electrode 36 which may be comprised of a secondary emission type material such as KCl or induced conduction material such as silicon, for example. The target electrode 36 may store the picture image until the electron gun mechanism 38 "reads out" the electron image which is usually scanned serially one line at a time. Each target electrode "read out" is considered a TV picture frame and the serially read out charge information constituting a picture frame is normally transmitted over signal line 40 at approximately 30 frames per second.

The gimballed mechanism 16 of the preferred embodiment is designed and constructed in a well-known manner to stabilize the reflector 12 for the purposes of maintaining the predetermined target within the field of view of the receiving area 24 of the TV camera 14. For the operation of video tracking, as applied to an aircraft for example, the maximum rate at which the reflector 12 may be expected to scan is on the order of 1 to 2 Hz and this is well within the performance expectations of the state-of-the-art gimballed mechanisms 16 which may respond as rapidly as 10 to 15 Hz, in some cases. However, the combination of structural members (not shown) which are conventionally used to couple the mirror 12 to the gimballed mechanism 16 to achieve this expected rapid scan response render the mirror reflector 12 susceptible to various resonance frequency modes because of their finite stiffness properties. Since the gimballed mechanism 16 is usually coupled to the aircraft frame, it is vulnerable to mechanical aircraft disturbances such as airstream vibration and engine hum, for example, which will have origins in terms of g's as a measure of vibration frequency bandwidths. Under some conditions, these undesirable aircraft-type, high-frequency disturbances are coupled through the mirror-gimbal supporting structural members to the mirror reflector 12 and cause the mirror reflector 12 to vibrate at the resonant frequency modes which may fall within the frequency bandwidth of 100's of hertz as set up by its structural members.

As a result of these unwanted vibratory disturbances shown simply by the angle $\alpha$ in FIG. 2, which denotes an angular rotation of the mirror 12 about the axis 18, the reflected image denoted by the dotted line 22 moves through an angle, which may be $2\alpha$ if a 2:1 coupling mechanism is employed, to a new position as shown by dotted line 22'. As the mirror 12 vibrates back and forth through the rotational angle $\alpha$, the reflected image 22 (22') will concurrently be oscillatorily deflected through a corresponding angle, say $2\alpha$, for example. In some cases, these vibrations of the mirror 12 angularly about the axis 18 may be comprised of frequencies into the 100's of hertz causing the reflected image 22-22' to move concurrently therewith. Consequently, all of the image deflection frequencies above say 15-20 Hz projected onto the receiving area 24 of the TV camera 14 may cause blurred and fuzzy images in the pictorial representation of the TV camera 14.

An electronic image motion compensator has been included as part of the electro-optical system 10 to electronically compensate for these unwanted image deflections. At least two accelerometers 50 and 52 may be disposed on the mirror 12, preferably at the ends thereof about the axis 18, to sense the angular motion of the mirror 12 with respect to the rigid body motion of the other elements of the electro-optical system 10 like the TV camera 14, for example. These accelerometers 50 and 52 are preferably matched for motion sensing purposes and may have dimensions on the order of 0.375 inches wide ($\sim 1$ cm) and 0.125 inches thick ($\sim \frac{1}{3}$ cm) possibly looking like a teardrop in shape. The accelerometers 50 and 52 may have a response range as high as 1000 Hz and beyond. Signals 54 and 56, representative of the sensed motion of the mirror 12 and generated by the accelerometers 50 and 52, respectively, are coupled to an electronic processing unit 57 which conditions and scales them in accordance with the design of the particular electro-optical system 10 and the type and application of the device in which it is incorporated.

A plurality of conventional deflection coils shown simply at 58 and 60 are disposed within the image intensifier portion 26 of the TV camera 14 in a manner well known to those skilled in the pertinent art (see U.S. Pat. No. 3,641,261, referenced supra). Currents are passed through the deflection coils 58 and 60 from signal line 62 and 64, respectively, to deflect the electron image 32 being projected on the target electrode 36 to compensate for the undesirable vibratory motion of the mirror 12 and reflected image denoted by lines 22-22'. The currents over signal lines 62 and 64 are generated by the electronic unit 57 as a function of the processed angular motion of the mirror 12 derived from the accelerometer signals 54 and 56. The electronic unit 57 additionally monitors the high voltage source 34 of the image intensifier 26 over signal line 66 and compensates the currents to the deflection coils 58 and 60 in accordance therewith.

Most TV cameras, like the one shown at 14, include an automatic light control feature (not shown) which alters the high voltage 34 across the image intensifier 26 to maintain a constant image intensity under the conditions of changing light intensity in the field of view of the TV camera 14. Thus, to be fully effective, the electronic processing unit 57 accommodates for this change in voltage 34 by altering the currents passing through the coils 58 and 60 as a function of the measured high voltage 34 supplied thereto over signal line 66.

In summary, a plurality of deflection coils 58 and 60 are disposed within the image intensifier section 26 and are electrically driven with currents supplied over signal lines 62 and 64, respectively, from the electronic processing unit 57 to compensate for unwanted movement in the electron image 32. By sensing the motion of the mirror 12 by the accelerometers 50 and 52, the electronic unit 57 may supply the appropriate current to the deflection coils 58 and 60 according to the undesirable motion of the mirror 12 so that the electron image 32 projected onto the target electrode 36 may be held stationary (i.e. substantially free from blurry and fuzzy images). The electronic unit 57 will be described in greater detail herebelow.

Figure 3:
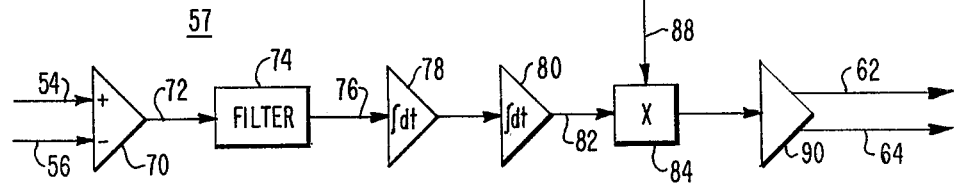
FIG. 3 is a schematic block diagram of an electronic processing unit suitable for use in the embodiment of FIG. 2.

Referring to FIG. 3, the two signals 54 and 56 generated from the at least two accelerometers 50 and 52, respectively, are representative of both translational and rotational motion of the mirror 12 with respect to the axis 18. Translational motion of the mirror 12 is not considered critical to reflected image distortion and is eliminated from the accelerometer signals 54 and 56 in the electronic unit 57 by initially processing them with a summing amplifier function 70, for example. One signal 54 may be coupled to the positive input of the amplifier 70 and the other signal 56 may be coupled to the negative input. By subtracting these two signals 54 and 56 and scaling their difference appropriately in the amplifier 70, the resulting signal 72 is representative of only the rotational or angular motion of the sensed reflector 12.

It is understood that signal 72 is representative of the angular acceleration of the mirror 12 and comprises substantially all of the frequency components of both desirable and undesirable reflector angular movement. Consequently, a high pass filter 74 is cascaded with the summing amplifier 70 to electronically block a range of low frequency acceleration components from the sensed angular acceleration signal 72, thus ensuring that the electronic processing unit 57 is unresponsive to and will not falsely correct for desired reflector mirror motions necessary for low-frequency, rigid-body, line-of-sight stabilization as rendered primarily by the gimballed mechanism 16 (see FIG. 2). The filter break point may be selectively adjusted to pass over signal line 76 only those sensed acceleration frequencies of the reflector element 12 which are considered undesirable resulting primarily from resonating vibration and jitter of the supporting structure of the mirror 12. Thus, false corrections of the electron image 32 as a result of necessary motion of the mirror reflector 12 are prevented by the high pass filter 74 which may be conventionally implemented by an active circuit arrangement of operational amplifiers generally well known to those skilled in the art. A conventional two-pole filter arrangement having a common adjustable breakpoint may be considered suitable for the purposes of this embodiment.

The signal 76 is next coupled to two cascaded integrators 78 and 80 which may be of a typical operational amplifier configuration. These integrators 78 and 80 provide for double integration of the signal 76 with respect to time to yield a signal 82 which is substantially proportional to the undesirable line-of-sight displacement caused by the resonating reflector element 12 such as that shown by the angle $2\alpha$ in FIG. 2. The integrators 78 and 80 may be scaled appropriately to yield a displacement signal 82 within the effective working range of the TV camera 14. The signal 82 is coupled to one input of a typical analog multiplier 84. The signal 34 representative of the high voltage potential which accelerates the electron image 32 to the target electrode 36 is provided to a conventional square root circuit 86, the output signal 88 of which is coupled to the other input of the analog multiplier 84. The multiplier 84 is used to correct the signal 82, which is representative of the undesirable displacement of the reflected images 22-22', for changes in the high voltage 34 generally resulting from the automatic light control feature of the TV camera 14.

An electronic amplifier 90 amplifies the output signal of the analog multiplier 84 to provide the current signals 62 and 64 to drive the deflection coils 58 and 60, respectively. The currents passing through the deflection coils 58 and 60 set up magnetic fields suitably disposed within the image intensifier section 26 of the TV camera 14 which deflect the electron image 32 in a well-known manner to compensate for the undesirable reflected image movement 22-22' resulting from the unwanted vibrations or jitter of the reflector optical element 12. In this preferred embodiment, the primary limitation to the frequency response of the image motion compensator comes from the amplifier-deflection coil response and may be on the order of 2000 Hz under proper conditions.

While the preferred embodiment has been described in connection with a movable reflector optical element like the rotatable mirror 12 shown in FIG. 2, it is understood that the principles of the invention may similarly be applied to any of the optical elements in the line-of-sight guide path of an electro-optical system which may distort the image projected onto the receiving area of a TV camera as a result of unwanted vibrations or mechanical jitter.

We claim:

1. In an electro-optical system including a TV camera having an image intensifier portion and a plurality of deflection coils disposed therein for deflecting the electron image of said TV camera as a function of the current passing therethrough; and at least one optical element disposed external to said TV camera for guiding the line-of-sight path of said TV camera to project predetermined target images on the receiving area of said TV camera, said at least one optical element incurring, at times, both desirable tracking stabilization movement to substantially prevent image movements with respect to said TV camera and undesirable vibrating movements causing unwanted resolution distortions to said projected target images in said TV camera, an electronic image motion compensator comprising:

at least two accelerometers coupled to said at least one optical element in said electro-optical system for generating signals representative of translational and rotational movement of said at least one optical element with respect to at least one axis thereof;

first means for eliminating from said accelerometer signals that portion representative of said translational movement and that portion representative of said rotational movement having frequencies substantially within a first frequency range to separate substantially from said accelerometer signals a first signal representative of said undesirable rotational vibrating movements of said at least one optical element having frequencies falling within a second frequency range which is greater than said first frequency range;

second means for converting said separated first signal into a second signal which is representative of said resolution distortion to said predetermined target images; and third means for supplying current to said plurality of deflection coils as a function of said second signal to electronically compensate for said resolution distortion of said projected target images in said TV camera.

2. The electro-optical system in accordance with claim 1 wherein the TV camera has applied across the image intensifier portion thereof a varying high-voltage potential; and wherein said image motion compensator includes a fourth means for altering the current supplied to the deflection coils in accordance with the variation in said high-voltage potential, said fourth means comprises:

means for generating a third signal representative of the square root of the high-voltage potential; and means for multiplying said second signal by said third signal to generate a signal which governs the current supply of the third means.

3. An image motion compensator in accordance with claim 1 wherein the predetermined optical element is a reflector optical element rotatably controlled about the at least one axis in a desirable movement to guide the line-of-sight path of the TV camera, said reflector optical element having a desirable image motion stabilizing movement responsiveness substantially within the first frequency range; and wherein said reflector element incurring undesirable vibratory movements which may include both translational and rotational displacements with respect to the at least one axis, said undesirable rotational displacements having frequencies falling substantially within the second frequency range.

4. An image motion compensator in accordance with claim 3 wherein the reflective optical element is a mirror reflector; wherein said at least one axis is normal to both the incident and reflected image paths of said mirror reflector; and wherein the at least two accelerometers are disposed at opposite ends of the mirror with respect to said at least one axis to measure rotational movement thereabout.

5. An image motion compensator in accordance with claim 4 wherein the second means comprises a first integrator circuit to convert the angular acceleration measurements of the first signal into an intermediate signal representative of the undesirable angular velocity of the mirror reflector; and a second integrator circuit to convert said intermediate signal into said second signal which is representative of the undesirable angular displacement of the mirror reflector.

6. In an electro-optical system including a TV camera having an image intensifier portion and a plurality of deflection coils disposed therein for deflecting the electron image of said TV camera as a function of the current passing therethrough; and at least one reflector optical element being desirably pivoted about at least one axis for guiding the line-of-sight path of said TV camera to project predetermined target images on the receiving area of said TV camera, said at least one axis being normal to both the incident and reflected image paths of said reflector element, said reflector element incurring at times, undesirable translational and rotational movements with respect to said at least one axis which cause disturbances to said projected target images, an electronic image motion compensator comprising:

two accelerometers disposed at said reflector element oppositely about said at least one axis of said reflector element for generating signals representative of the movement of said reflector element;

a summing amplifier for subtracting the accelerometer signals to eliminate therefrom that portion of the signals which is representative of translational movement of said reflector element;

a high pass filter cascaded with said summing amplifier to filter out from the output of said summing amplifier that frequency content associated with the desirable pivotal movement of said reflector about said at least one axis and passing substantially that frequency content associated with the undesirable rotational movement of said reflector;

two cascaded integrators for double integrating the output of said high pass filter to generate a signal representative of the undesirable rotational displacement of said reflector about said at least one axis, said undesirable rotational displacement causing distortion of said projected target images; and a current amplifier for supplying current to said plurality of deflection coils as governed by the generated signal from said double integrator to electronically compensate for the distortion of said projected target images in said TV camera.

7. An image motion compensator in accordance with claim 6 wherein the TV camera has applied across the image intensifier portion thereof a varying high-voltage potential; and wherein the signal generated from the double integration is multiplied by a signal representative of the square root of the high-voltage potential to compensate for variation thereof.

8. An image motion compensator in accordance with claim 6 wherein the reflector element is a mirror reflector, and wherein the two accelerometers are disposed at opposite ends of the mirror reflector with respect to the at least one axis to measure rotational movement thereabout.

* * * * *